United States Patent
Basilico

[19]
[11] Patent Number: 6,009,092
[45] Date of Patent: *Dec. 28, 1999

[54] LAN SWITCH ARCHITECTURE

[75] Inventor: Albert Richard Basilico, Raleigh, N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,105

[22] Filed: Dec. 24, 1996

[51] Int. Cl.$^6$ ............................................. H04J 3/02
[52] U.S. Cl. ................................. 370/352; 370/465
[58] Field of Search ...................... 370/352, 359, 370/369, 370, 388, 390, 412, 413, 419, 420, 392, 408, 401, 423, 465

[56] References Cited

U.S. PATENT DOCUMENTS

| | | | |
|---|---|---|---|
| 4,845,722 | 7/1989 | Kent et al. .............................. | 370/58 |
| 5,179,552 | 1/1993 | Chao ......................................... | 370/60 |
| 5,179,669 | 1/1993 | Peters ....................................... | 395/325 |
| 5,189,665 | 2/1993 | Niehaus et al. ...................... | 370/458.1 |
| 5,197,064 | 3/1993 | Chao ......................................... | 370/60 |
| 5,261,059 | 11/1993 | Hedberg et al. ...................... | 395/325 |
| 5,264,842 | 11/1993 | Granaszek .......................... | 340/825.79 |
| 5,404,461 | 4/1995 | Olnowich et al. ..................... | 395/325 |
| 5,619,500 | 4/1997 | Hiekali ................................... | 370/419 |
| 5,623,489 | 4/1997 | Cotton et al. .......................... | 370/388 |
| 5,689,644 | 11/1997 | Chou et al. ............................. | 370/424 |
| 5,724,351 | 3/1998 | Chao et al. ............................. | 370/397 |

*Primary Examiner*—Min Jung
*Attorney, Agent, or Firm*—Joscelyn G. Cockburn

[57] ABSTRACT

A LAN switch architecture has a hybrid switch fabric which combines crossbar and time division multiplexed bus architecture and allows next-available transmit channel routing and associative output-port routing. The LAN switch architecture has multiple port groups with multiple device ports, a switching fabric for facilitating communication between device ports in different port groups and a controller for controlling the switching fabric. Each of the multiple port groups comprises a communication channel for interconnecting the port group to the switching fabric.

11 Claims, 1 Drawing Sheet

LAN SWITCH ARCHITECTURE

BACKGROUND OF THE INVENTION

1. Field of the Invention

This invention relates to a local area network (LAN) switch architecture, and particularly to a high speed LAN switch which combines different bus architectures to provide superior performance in throughput and latency for switching 1 Mbps–155 Mbps LAN traffic.

2. Description of the Prior Art

Prior art LAN switches are based either on a crossbar architecture or on a time division multiplexed bus architecture.

U.S. Pat. No. 5,264,842 to P. A. Franaszek describes switch connections with wait chains. In a multiport communication system requestors for a busy port are enqueued in the wait chains. The connectivity of a crossbar switch is employed to store the wait chains. Elements of the wait chain are modified to provide the right connections; that is, a group of ports are connected by a form of linked list but with the pointers being comprised of connections in the switch itself. These connections are used both for storing the list structure as well as passing information. This concept requires control information to be transmitted from one port to subsequent ports of the switch fabric matrix.

In U.S. Pat. No. 5,179,552 to H.H. J. Chao a knockout switch design is described. The crosspoint matrix switching element for a large packet switch or a non-buffer based statistical multiplexor uses a crossbar matrix network in which the output ports of individual switching elements are partitioned into various groups in order to share routing paths among the elements in any such group. The outputs of each such group are themselves recursively partitioned into a succession of serially connected groups that each provides a decreasing number of outputs until one such output is provided for each corresponding output port of the switch. The switching element includes a control circuit which compares corresponding bits of two incoming bit streams in specific time windows to generate control signals and a routing circuit responsive to the control signals for routing the two input bit streams alternatively to two data outputs. With this method, if more packets than the switch can handle are presented to the "concentrator", the "concentrator" simply "knocks" them out and relies on the error detection and message re-transmission functions of "higher layer software" to re-transmit the discarded data. Reliance on higher layer protocols to detect lost packets and re-transmit them can produce excessive packet latency and session drop-out due to time-outs. In addition, the re-transmission of "knocked-out" packets further contributes to network congestion and can cause additional packets to be knocked out. This method also uses multiple cell buffers, each such buffer adding one cell delay. This is undesirable in a LAN switch environment where minimum packet latency is highly desired.

U.S. Pat. No. 5,197,064 to H.-H. J. Chao describes a distributed modular packet switch employing recursive partitioning. Such a switch utilizes channel grouping to improve overall performance and a crossbar switching fabric that internally distributes contention resolution and filtering functions among the individual switching elements themselves. Output port grouping is applied recursively until one output path is provided for each output port.

U.S. Pat. No. 5,189,665 to J. A. Niehaus et al. discloses a digital crossbar switch designed to facilitate interconnection of up to 8 data ports. The device includes 8 bidirectional ports, each 8 bit wide. Interconnection of the port is controlled by 32 stored control memory locations associated with each port. In the LAN environment, where port densities in the hundreds are common and desirable, the limitation to an 8 port maximum makes this switch un-attractive.

In U.S. Pat. No. 5,404,461 to H. T. Olnowich et al. a broadcast/switching apparatus for executing broadcast/multi-cast transfers over unbuffered asynchronous switching networks is described. The patent teaches a method of transmitting data as unicast, multicast or broadcast packets using an asynchronous approach to resolve either broadcast or multicast contention among input ports. The broadcast/switching apparatus makes connections from any one of the input ports to any one of the output ports, from any one of the input ports to a fixed number of subsets of multiple output ports simultaneously or from any one of the input ports to all output ports simultaneously.

U.S. Pat. No. 5,179,669 to D. V. Peters teaches a multiprocessor interconnection and access arbitration arrangement. The processors in the multiprocessor system are interconnected by a non-blocking communication medium such as a crossbar switch. By an optical link each processor is connected to a dedicated port circuit at the crossbar switch. By an electrical link each port circuit is connected to the crossbar switch. The port circuits are interconnected by a contention medium. Circuitry at each port circuit receives requests for access to the connected processor, prioritizes conflicting requests and grants them sequentially.

This arrangement uses one link between each port of the switch fabric and each attached processor node.

In U.S. Pat. No. 4,845,722 to A. R. Kent et al. a computer interconnect coupler employing crossbar switching is disclosed. The coupler has a set of junctors which are assigned to channel transmitters and channel receivers for the routing of messages from the channel receivers which are addressed to the channel transmitters. When a message is received by a channel receiver, the channel receiver stores the beginning portion of the message in a first-in-first-out buffer and sends a route message request to central switch logic. If the destination transmitter or receiver is busy, the central logic places the message request on a destination queue and returns a signal to the requesting source transmitter to turn on a flow control signal which is transmitted back to the data processing device having originated the message. Any message addressed to this data processing device, however, is inserted into the flow control carrier with pauses both before and after the message, and provisions are also made to allow the data processing device to return an acknowledgement code responsive to the incoming message. The requests are grouped into different priority levels and separate but duplicate arbitration logic is used to resolve simultaneous requests within the same priority group. This patent teaches the use of one bi-directional link or two uni-directional links between each port of the crossbar switch and each attached processor node.

U.S. Pat. No. 5,261,059 to W. F. Hedberg et al. describes a crossbar interface for a data communication network. The crossbar interface between a host computer and a crossbar switch employs data buffering using multiple-port RAM devices. The receive and transmit data is clocked into or out of separate serial ports of the RAM, and at the same time a local processor can access the RAM by a random access port, asynchronous to the serial ports, to execute the protocol. The order of storing bursts of data in the multiple-port RAM is defined by a free buffer manager which keeps account on which locations are free. The addresses of these locations are moved to a received list after being used for incoming packets. After the protocol processor has finished with its tasks, these addresses, referred to as burst data descriptors, are moved to a transmit list to await loading of burst data back to the serial registers for clocking out, then when transmitted the descriptors are again entered into the free buffer manager. This patent teaches the use of a dual-port RAM to improve the efficiency of communications between two connected processors.

SUMMARY OF THE INVENTION

It is therefore an object of the present invention to provide a LAN switch architecture which shows superior performance in throughput and latency and which does not use the concept of wait chains or the knock-out technique.

It is another object of the invention to provide a method for routing and transmitting data packets in a LAN switch architecture without discarding packets and without requiring the transmittal of control information.

The present invention provides a hybrid switch fabric which combines crossbar and time division multiplexed bus architecture and a next-available transmit channel routing and associative output-port routing method.

The LAN switch architecture has multiple port groups, a switching fabric for facilitating communication between device ports in different port groups and a controller for controlling the switching fabric. Each of the multiple port groups comprises a communication channel for interconnecting the port group to the switching fabric.

In a LAN switch architecture with multiple port groups, a switching fabric for facilitating communication between device ports in different port groups, a controller for controlling the switching fabric and with each port group including a communication bus for interconnecting the device ports of the port group, a controller for controlling transmission on the communication bus, and multiple communication channels for interconnecting the port group to the switching fabric, a routing header with the destination address is assigned to each frame to be transmitted, the frames are routed and transmitted from a source address to the destination address, and if the destination address and the source address of frames to be transmitted are within the same port group in one or more of the multiple port groups the frames are simultaneously routed and transferred between ports of the same port groups without using the switching fabric.

DETAILED DESCRIPTION OF A PREFERRED EMBODIMENT OF THE INVENTION

Figure 1A:
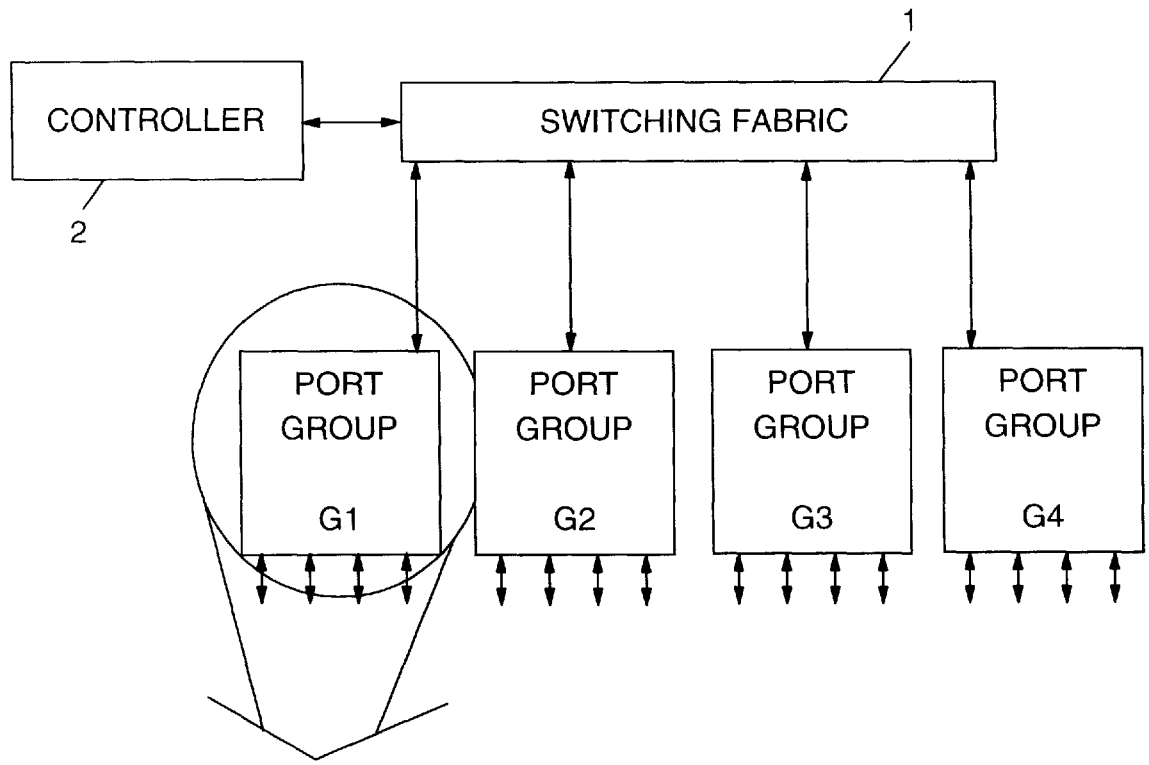
FIG. 1A illustrates generally the preferred embodiment of the present invention with 4 time division multiplexed subgroups.

The preferred embodiment shown in FIG. 1A is a LAN switch architecture with a switching fabric, preferably an asynchronous packet switch 1 and, in this example, four 4-port line cards or time division multiplexed port groups G1 to G4. Instead of only four, multiple port groups G1 to Gi with i=1 . . . n may be connected to the packet switch 1.

Figure 1B:
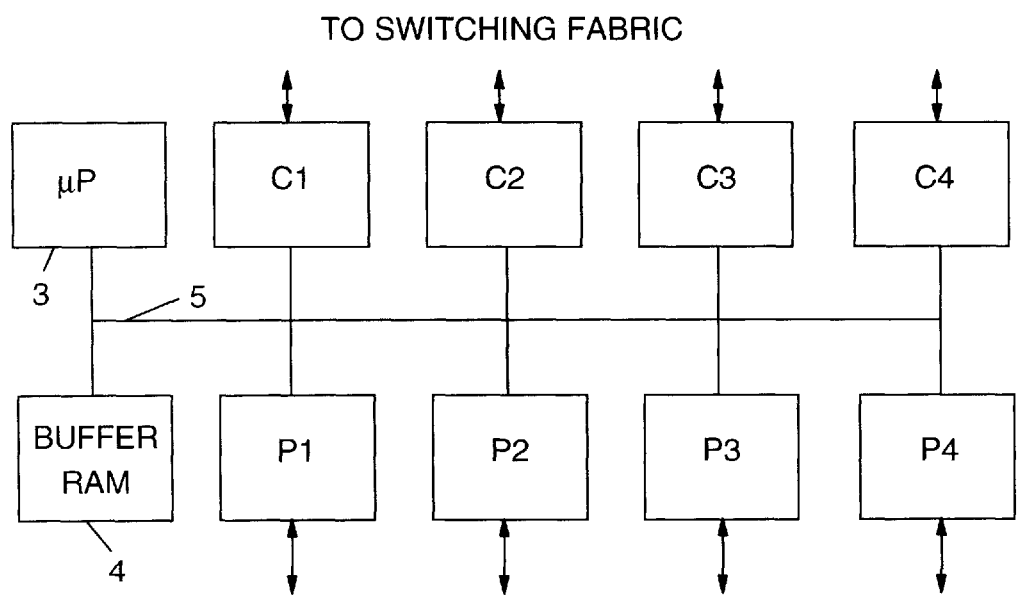
FIG. 1B illustrates in more detail one subgroup comprising in this embodiment 4 port chips and 4 channel chips.

Referring to FIG. 1B, each port group is defined as comprising a multiplicity of port chips P1 to Pk and a multiplicity of channel chips C1 to Ck with k=1 . . . n. In this special embodiment each port group comprises four port chips P1, P2, P3, P4 and four channel chips C1, C2, C3, C4. The channel chips C1, C2, C3, C4 connect the port group G1 to the switching fabric 1.

The port chips P1, P2, P3, P4 provide the appropriate LAN physical layer, media access control, buffering and bus interface functions. Each port chip is capable of half-duplex, or optionally, full-duplex operation. In FIG. 1b the port chips are shown as discrete entities, but they may also be implemented as a dual or quad port chip. The LAN physical layer/media access control will typically include auto-negotiation functions to determine LAN operation speed, media type half- or full-duplex transmission etc. Personal computers (PCs) or workstations are connected to the port chips P1, P2, P3, P4.

Like port group G1 each port group further comprises a microprocessor 3 or other state-machine logic, and an optional buffer RAM 4. The elements of a port group are interconnected by a common data path 5, e.g. a parallel bus, preferably a 32-bit bus. Data is moved between the port chips and/or the channel chips in the multiplexed port group by the microprocessor 3 via PIO and/or block move instructions, by DMA logic, or other similar means. Each port chip P1, P2, P3, P4 and each channel chip C1, C2, C3, C4 is granted access to the bus 5 so that data latency is minimized and bus utilization is optimized.

Besides the switching fabric 1 which facilitates the communication between device ports in different port groups the LAN switch architecture further comprises a controller 2 for controlling the switching fabric.

Whereas in existing designs all switch ports are attached to a single bus fabric, in this LAN switch architecture multiple disjoint port groups Gi provide sub-fabrics that allow simultaneous routing and transfer of frames. A frame with a destination address/port within the same port group as the source address/port is transferred directly, port to port, without using the switching fabric 1. For example, simultaneous transfers are possible between ports P1 and P4 of the same port group G1 and between ports of another port group Gi. This provides improved performance in latency and throughput and better costs per port.

The microprocessor 3 or other similar means associated with each port group Gi discovers the source address of the PCs or workstations attached to each port chip P1, P2, P3, P4 by polling each port or examining the source address field of received frames. When a port chip has a frame to be transmitted, it interrupts the microprocessor 3 after the receipt of the frame's destination address field. The microprocessor 3 or other state-machine calculates a mapping of destination address to switch port number, e.g. via a table lookup in the local RAM, and pre-pends a routing header to the frame to be transmitted.

Alternatively, a content addressable memory (CAM) or an associative memory could be used for the mapping function. If the frame's destination address is not in the local processor's table, a message is sent to the controller 2 requesting the destination address-to-switch port mapping information. Alternatively, the local processor can pre-pend a header routing the frame to the controller 2 for forwarding and deferred update of the local route table.

In known LAN switch architectures each port has a single, dedicated path for accessing the switching fabric. If a frame is stalled, e.g. because its destination port is busy, then frames in queue behind the stalled frame are also stalled even though their destination port may be free and available.

In the new LAN architecture of this invention each port chip has access to a multiplicity of channels to the switching fabric. In the preferred embodiment of FIG. 1b each port chip P1, P2, P3, P4 has access to four channels C1, C2, C3, C4. If a stalled frame is blocking channel C1, a queued frame can be transmitted via channels C2, C3 or C4.

This next available input channel routing method transferring data from an input queue to the switching fabric via one of a multiplicity of available channels is different than an input buffered design. An input buffered switch has several transmit queues per port, but only a single path or channel per port into the switching fabric. The method described here provides a multiplicity of transmit queues associated with a multiplicity of transmission channels or paths per port.

With some LAN protocols the transport layer ensures that frames arrive in correct order. Other protocols require the data link layer to ensure that frames arrive at their destination in sequence. In the later case, the next available transmit channel routing algorithm is modified so it will not move more than two frames with the same destination address to any transmit channel. If a third frame is queued and has a destination address identical to the previous two frames, then the third frame can either be routed to the local SRAM and forwarded later, but prior to any new frame at the top of the port queue bound for the same destination address, or the queue can be allowed to stall until transmission of the first frame is completed.

Output-port contention causes packet transmission to become stalled when a packet is bound for a switch port that is already in use. Some existing designs employ output-port buffering in an effort to minimize output-port contention. E.g. via a buffer memory at each output-port, multiple receive-packet queues are implemented. Once a frame is completely in a receive queue, the port can accept another frame from the switching fabric while the first frame is being transferred to the destination workstation. All frames must flow through a single output-port.

The associative output-port routing method of this invention associates multiple output ports with a multiplicity of output queues. This technique increases the probability that a frame bound for an output-port will find a non-busy channel and allows multiple frames to be accepted simultaneously. Associative output-port routing dynamically allocates channel chips to output ports as the instantaneous traffic load requires. For example, with output-port buffering, a frame F, bound for port P1, would be temporarily stalled if a transmission was already in progress to P1. Transmission of frame F would proceed once the first frame is entirely in an output buffer queue.

This associative output-port routing method avoids the bottleneck of a single channel feeding several output-port buffer queues. The switching fabric recognizes that channel C1 is busy, so it transparently routes the second frame to channel C2 or C3 or C4, each of which have an independent receive-buffer queue. When port P1 becomes available, the data transfer from C2 or C3 or C4 to P1 takes place. Header processing to determine the packet's destination port chip can be performed in parallel with other data transfers.

Whereas output port buffering associates a single receive port, multiple receive queues and a single receive channel, associative output-port routing associates a single receive port, one or multiple receive queues and a multiplicity of receive channels.

In addition to performing control functions and network route discovery, the controller 2 handles broadcast and multicast transmissions. When a port chip receives a broadcast frame, it prepends a routing header that routes the frame to the controller or hub engine 2. The hub engine stores the broadcast frame in its local RAM and using as many hub channels as are available, retransmits the broadcast/multicast frame in a parallel/sequential fashion to the destination ports.

Transmission thus takes place in parallel, using as many channels as are available, and it is not required to wait for all destination port channels to be idle. Transmission occurs sequentially as each channel/port becomes available. This method does not require the quiescence of all frame transmissions before the broadcast/multicast proceeds.

While the invention has been described in terms of a single preferred embodiment, those skilled in the art will recognize that the invention can be practiced with modification within the spirit and scope of the appended claims.

What is claimed is:

1. A LAN switch system including:

multiple port groups with each port group having a bus and multiple device port chips connected to the bus;

a switching structure that facilitates communication between device port chips in different port groups;

a first controller that controls the switching structure connected to the switching structure;

a second controller connected to the bus; and multiple communications channel chips connected to the bus and interconnecting each one of the port chips to the switching structure wherein the second controller in response to signals from any one of the port chips transfer data from one device port chip to any other one of the device port chips or from one device port chip through any one of the multiple communications channel chips to the switch structure.

2. The LAN switch of claim 1 wherein said switching structure comprises a switching fabric.

3. The LAN switch of claim 2 wherein the switching fabric includes an asynchronous packet switch.

4. The LAN switch of claim 1 wherein said bus comprises a time division multiplexed bus.

5. The LAN switch of claim 1 wherein each of said multiple port groups further comprises buffering device connected to the bus.

6. The LAN switch of claim 1 wherein each of said multiple communication channels has at least one independent receive-buffer queue.

7. In a LAN switch system including multiple port groups with each port group having multiple device port chips, a communication bus for interconnecting the device port chips of a port group, a switching fabric for facilitating communication between device port chips in different port groups, a switch controller for controlling the switching fabric, a bus controller for controlling transmission on said communication bus, and multiple communication channels for interconnecting each one of said port chips to said switching fabric, a method for transmitting data in said switch system including the steps of:

assigning a routing header with a destination address and a source address to each frame to be transmitted in at least two port groups;

examining the routing header; and if the destination address and the source address of each frame to be transmitted are within the same port group of the at least two port groups then using the communication bus in each of the at least two port groups to simultaneously route and transfer each frame between port chips without using the switching fabric.

8. The method in accordance with claim 7 further comprising the steps of:

routing each of said frames through a selected one of said multiple communication channels of a port group to said switching fabric if the destination address and the source address of frames to be transmitted are within different port groups;

if said selected one of said multiple communication channels of said port group is busy then routing said frame to any available channel of said multiple communication channels of said port group;

transmitting said frames from said switching fabric to the destination address in a destination address port group using a selected one of said multiple communication channels of said destination address port group; and if said selected one of said multiple communication channels of said destination address port group is busy then routing said frame through any available channel of said multiple communication channels of said destination address port group.

9. The method in accordance with claim 8 wherein said frame is a broadcast frame or a multicast frame and wherein said step of transmitting said broadcast frame or multicast frame from said switching fabric to the destination address port groups further comprises the steps of:

routing said broadcast frame or multicast frame to switch controller;

storing said broadcast frame or multicast frame in switch controller; and simultaneously retransmitting said broadcast frame or multicast frame from said controller to said destination address port groups via said switching fabric using as many of switch multiple communication channels of said destination address port groups as available without waiting for all destination address ports to become idle.

10. A Local Area Network (LAN) communication device comprising:

multiple port groups having multiple device port chips within each one of said multiple port groups;

a crossbar switching fabric interconnecting the multiple port groups;

a first controller connected to the switching fabric;

a non-serial bus coupling the multiple device port chips within a port group;

multiple communications channels interconnecting each port chip in each of the port groups to the switching fabric; and a second controller connected to each bus coupling the multiple device port chips wherein the second controller in response to signals from any one of the port chips transfers data between port chips in the same group or transfers data from a port chip via any of the multiple communications channels to the crossbar switching fabric.

11. A LAN switch system including:

multiple port groups with each port group having multiple device port chips;

a packet switch for facilitating communication between device port chips in different port groups;

a first controller for controlling the packet switch;

wherein each of said multiple port groups further comprises a time division multiplexed communication bus interconnecting the device port chips in each of said port group;

a memory coupled to said communication bus;

multiple communication channels interconnecting the time division multiplexed communication bus of each port group to said packet switch; and a second controller that controls transmission on said communication bus wherein said second controller in response to signals from a device port chip in any port group transfers data from the device port chip through any of the multiple communication channels to the packet switch and said packet switch may forward data via any one of the communication channels associated with the port group to a port chip in said port group.

* * * * *